United States Patent [19]

Profio

[11] Patent Number: 4,858,053

[45] Date of Patent: Aug. 15, 1989

[54] OPERATIONAL AMPLIFIER HAVING AN IMPROVED FEEDBACK SYSTEM INCLUDING AN INTEGRATOR HAVING A HURRY-UP CIRCUIT, AND AN ELECTRIC MOTOR CONTROL USING THE SAME FOR INVERSE TRIP SELECTION

[75] Inventor: Mark V. Profio, Wauwatosa, Wis.

[73] Assignee: Square D Company, Palatine, Ill.

[21] Appl. No.: 82,975

[22] Filed: Aug. 4, 1987

Related U.S. Application Data

[63] Continuation of Ser. No. 794,318, Nov. 1, 1985, abandoned, Continuation of Ser. No. 713,083, Mar. 15, 1985, abandoned, Continuation of Ser. No. 431,423, Sep. 30, 1982, abandoned.

[51] Int. Cl.⁴ .............................................. H02H 7/09
[52] U.S. Cl. ........................................ 361/23; 361/29; 361/86; 361/91; 361/94; 318/430; 318/782; 318/805
[58] Field of Search ............................ 361/23, 28–31, 361/86, 87, 89, 90, 91, 92, 93, 94; 318/430, 434, 782, 798, 805

[56] References Cited

U.S. PATENT DOCUMENTS

| | | | |
|---|---|---|---|
| 2,914,702 | 11/1959 | Diehold | 361/29 |
| 3,697,778 | 10/1972 | Olson | 307/229 |
| 3,731,232 | 5/1973 | Hekimian | 332/31 R |
| 3,808,503 | 4/1974 | Hentschel | 361/30 |
| 3,845,398 | 10/1974 | Katz | 328/127 |
| 3,904,971 | 9/1975 | Delagrange | 330/29 |
| 4,029,972 | 6/1977 | Fox et al. | 307/228 |
| 4,047,235 | 9/1977 | Davis | 361/94 X |
| 4,103,317 | 7/1978 | Krick | 361/31 |
| 4,163,947 | 8/1979 | Weedon | 328/128 |
| 4,228,366 | 10/1980 | Huttemann et al. | 307/229 |
| 4,249,622 | 1/1981 | Hosoda et al. | 361/95 |
| 4,276,860 | 7/1981 | Capurka | 123/415 |
| 4,288,828 | 9/1981 | Kuntner et al. | 318/430 |
| 4,305,008 | 12/1981 | Sutton | 307/261 |
| 4,335,339 | 6/1982 | Brickner | 361/31 X |
| 4,345,288 | 8/1982 | Kampf et al. | 361/31 |
| 4,359,649 | 11/1982 | Mundel | 307/268 |
| 4,368,500 | 1/1983 | Conroy, Jr. et al. | 361/94 |
| 4,398,231 | 8/1983 | Currence | 361/23 |
| 4,496,858 | 1/1985 | Smith | 307/519 |
| 4,506,177 | 3/1985 | Raab | 307/602 |
| 4,524,334 | 6/1985 | Brajder et al. | 331/135 |

FOREIGN PATENT DOCUMENTS 2532206  1/1977  Fed. Rep. of Germany .

*Primary Examiner*—Todd E. Deboer
*Attorney, Agent, or Firm*—Thomas B. Lindgren; Jose W. Jimenez

[57] ABSTRACT

A motor controller is adaptable to a wide range of motor currents by using an integrator circuit having an additional feedback arrangement for affecting the effective time constant of the integrator under specified conditions. The operational amplifier has an amplifier having a first input, a second input, and an output, an input resistor connected between an input of the operational amplifier and the first input of the amplifier, and a feedback impedance connected between the output of the amplifier and the first input of the amplifier. A voltage at the input of the operational amplifier is compared with a voltage at the first input of the amplifier. An auxiliary current path for the feedback impedance is provided when the voltage at the input of the operational amplifier has a predetermined relationship to the voltage at the input of the amplifier. When used as an integrator hurry-up circuit, the feedback impedance has an integrating capacitor, and the auxiliary current path for the integrating capacitor changes the time required for the capacitor to either charge or discharge, thereby effectively changing the integration time constant. An electric motor controller overload circuit using the improved operational amplifier permits switchably selecting a starting class for a selected electric motor.

12 Claims, 3 Drawing Sheets

OPERATIONAL AMPLIFIER HAVING AN IMPROVED FEEDBACK SYSTEM INCLUDING AN INTEGRATOR HAVING A HURRY-UP CIRCUIT, AND AN ELECTRIC MOTOR CONTROL USING THE SAME FOR INVERSE TRIP SELECTION

This application is a continuation of application Ser. No. 794,318, filed on Nov. 1, 1985 now abandoned. Application Ser. No. 794,318 is a continuation of application Ser. No. 713,083, filed Mar. 15, 1985, now abandoned. Application Ser. No. 713,083, filed Mar. 15, 1985 is a continuation of application Ser. No. 431,423, filed Sept. 30, 1982, now abandoned.

BACKGROUND OF THE INVENTION

This invention relates to motor controllers. In particular, this invention relates to a means of controlling polyphase induction motors, including those designed for starting by being placed directly across a line and those used with a reduced-voltage controller.

Control of polyphase induction motors may include such other features as action in response to detection of the loss of one or more phases in the power supplied to the machine, detection of a load jam in a motor that has previously been brought to speed, and detection of an underload or loss of load in a motor that has been at speed. The typical polyphase induction motor that is designed for starting across an AC line draws a maximum current of the order six to eight times the rated full-load current during a limited starting interval. The starting contactors for the motor are not normally designed to handle the short-circuit current that can be delivered to a short circuit across the power lines, so this protection must be supplied by fuses or circuit breakers that are also placed in the circuit. The full-load current, when carried continuously by the motor, represents a tolerable level of heating. Six or eight times that full-load current will normally exceed the steady-state capability of the motor and it is therefore necessary to limit both the time that such a current is drawn and the number of intervals during a given period of time in which such a current is drawn. In other words, the motor can carry an overload by a factor of six to eight for a limited period of time, but beyond that time the motor must be disconnected from the power supply to protect it. If the motor has been overloaded, either in starting for too long a period or in carrying too high a current in the steady-state, it will already be at or above operating temperature and will need a cooling period before an attempted restart.

A measure of heating of the motor that is appropriate is the line current supplied to the motor. It is possible to adapt a single controller to a wide range of motor currents by making an appropriate choice of current transformers and scalers in sensing the current in each phase of the motor power supply. It is evident that such a controller could also be operated by placing a single current transformer in one motor lead and using the signal from that current transformer to supply an input to a motor controller. However, it is usually desirable to place a current transformer in each motor lead and to combine signals from the current transformers to produce a single input to the controller. The use of multiple current transformers gives the additional ability to detect loss of one or more phases of the power supplied to the motor or an imbalance in phase currents due to a phase anomaly in the motor. In either case, whether one current transformer or a plurality is used, the result is to isolate the controller electrically from motor voltage. It is therefore appropriate to take the output of a motor controller to a contactor or other switch that will act in conjunction with other elements of a circuit to control power to the motor.

SUMMARY OF THE INVENTION

The invention solves the problem of adapting a single controller to a wide range of motor currents by using an integrator circuit having an additional feedback arrangement for affecting the effective time constant of the integrator under specified conditions. The operational amplifier is of the type having; an amplifier having a first input and a second input, an input to the operational amplifier, a first impedance connected between the input to the operational amplifier and the first input of the amplifier, an output of the amplifier which serves as an output of the operational amplifier, a feedback impedance connected between the output of the amplifier and the first input of the amplifier, comprising: means for generating a first voltage signal which changes as the voltage applied to the input to the operational amplifier changes; means for generating a second voltage signal proportional to a voltage at the first input of the amplifier; means for causing an additional current to flow to the first input to the amplifier when the second voltage signal has a predetermined value relative to the first voltage signal, thereby affecting the current flow through the first impedance and the feedback impedance. When used as an integrator hurry-up circuit, the feedback impedance is an integrating capacitor, and the additional current flow changes the time required for the capacitor to either charge or discharge, thereby effectively changing the integration time constant. An electric motor controller overload circuit using the improved operational amplifier permits switchably selecting a starting class for a selected electric motor.

BRIEF DESCRIPTION OF THE DRAWINGS

FIG. 2A is a further portion of the detailed circuit diagram of FIG. 2.

DETAILED DESCRIPTION OF THE INVENTION

Figure 1:
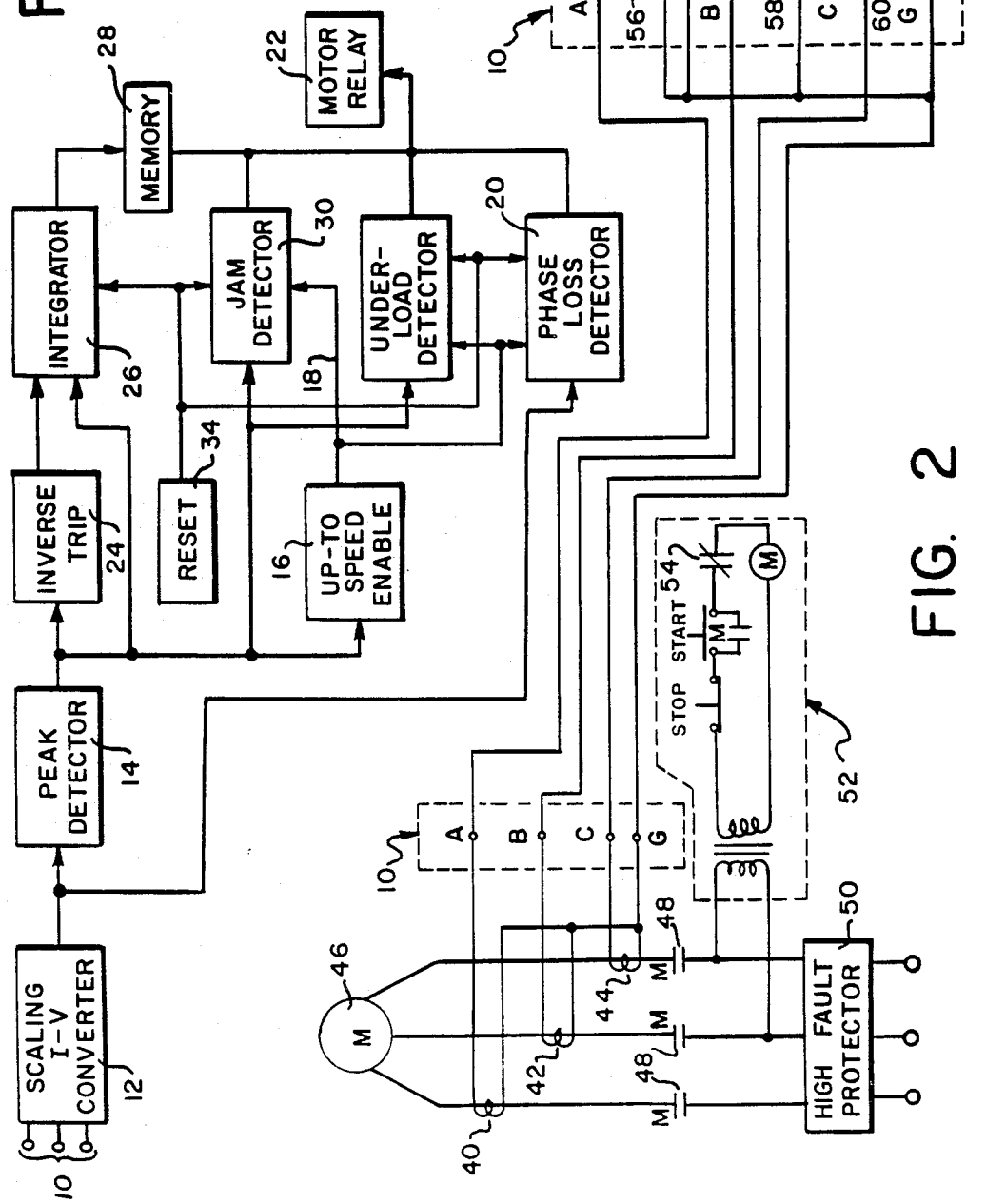
FIG. 1 is an overall block diagram of a circuit for the practice of the present invention.

FIG. 1 is an overall block diagram of a circuit for the practice of the present invention. In FIG. 1, terminals 10 receive a signal that is proportional to the current flow into a motor to be controlled. Three terminals 10 are shown in FIG. 1 because it is most common to find a three-phase electrical supply used to drive an electric motor of three or more horse power. This is the range of motors for which the present controller is designed. It is not uncommon to place a current transformer in each of the motor power leads to provide a signal that is proportional to the current in each phase that is supplied to the motor. It should be evident that a single current transformer could be used, applied to a single terminal 10, if the motor is single-phase or if the user does not wish to protect against the loss of one or more phases. This is a matter of design choice.

The signal at terminal 10 is applied to a scaling and summing current-voltage converter 12 which produces an output voltage that is proportional to some measure of the current at terminals 10. It is useful to produce as an output of current-voltage converter 12 a voltage that is proportional to a rectified logical sum of the currents applied at terminals 10. Converter 12 may also be adapted to scale the input values so that the same level of output voltages may be produced for varying values of inputs at terminals 10. This allows the circuit of FIG. 1 to be used to control motors over a range of rated values.

The output signal from the scaling current-voltage converter 12 is taken to peak detector 14 which produces a signal that is proportional to the peak value of its input voltage. The output signal from peak detector 14 is taken to up-to-speed enable circuit 16 which generates on line 18 a signal indicating that a motor being started is up to speed. The signal on line 18 is taken to enable various portions of the circuit. One of these is phase-loss detector 20, which receives an input signal from the output of scaling current-voltage converter 12. If there is a loss of one phase after the motor is up to speed, phase-loss detector 20 generates a signal that opens motor relay 22. The choice of enable for phase-loss detector 20 is one made by the designer. It would be possible to operate phase-loss detector 20 without an enable signal, responding to the loss of phase on start up.

The output of peak detector 14 is applied to two basic types of circuits. One type is effective during starting and after the motor is up to speed. The other type is enabled only after the motor is running. The first of these applies the output of peak detector 14 to inverse trip circuit 24 and also to integrator 26. Inverse-trip circuit 24 selects an appropriate trip curve to control the level of signal applied to integrator 26. The output of peak detector 14 is integrated in integrator 26 to produce an output that is a short-term product of current and time. Integrator 26 is so designed that if the current-time product during start or after achieving an up-to-speed condition exceeds a predetermined value, an output signal will be sent through memory 28 to motor relay 22 to trip the relay. The length of time allowed for an overcurrent on a motor start is selected in inverse trip circuit 24 and the scale of scaling current-voltage converter 12 is selected so that the desired full-load current of the motor generates at integrator 26 an input signal that is constant at a value that is not sufficient to trip motor relay 22.

Consider the normal values of currents in a motor being started. When voltage is applied to the leads of a stopped motor, current rises to some value that is typically as much as six to eight times the rated full-load current of the motor. The circuit from FIG. 1 must allow this overload for a period of time but must cause the motor to shut down before the overload is allowed to continue along enough to damage the motor. Integrator 26 as controlled from inverse trip circuit 24 and scaling current-voltage converter 12 provides for the application of a lesser overload for a longer time or a longer overload for a lesser time and functions identically if a sustained overload occurs after the motor has reached operating speed.

The types of motor protection that are desirable are partly matters of design choice and partly a function of the service to which the motor is applied. In some types of service a motor may drive a load that is subject to being jammed. An example of such service is a motor that drives a rock crusher or the like. If the load is likely to become jammed it is useful to have a circuit that protects the motor by stopping it on a jam. Such a function is carried out by jam detector 30 of FIG. 1 which receives an input signal from peak detector 14 that is proportional to motor current. Jam detector 30 is enabled by a signal on line 18 indicating that the motor is up to speed. After this happens a jam is represented at the input to jam detector 30 as a sudden increase in motor current. This causes jam detector 30 to send a cutoff signal to motor relay 22. Another desired control for some types of load is the detection of underload. This may be a protective feature for the load device or for the motor but it is effectively applied as a part of the motor control circuit. Thus, in FIG. 1, underload detector 32, after being enabled by a signal on line 18, detects a drop in motor current from its input signal. Underload detector 32 receives a signal from peak detector 14 indicating a reduction or a loss of load current and generates in response a signal that cuts off motor relay 22.

One other function is readily attained by the circuit of FIG. 1. This is protection of a motor against a quick restart when it has been tripped out by an overload that is followed by a momentary loss of power to the controller. This function is accomplished by memory 28 which receives an input from integrator 26 and produces a controlling output for motor relay 22. One output from memory 28 has already been described as the result of a starting overcurrent from integrator 26. If integrator 26 then produces a signal indicating overload that trips motor relay 22 memory 28 will hold motor relay 22 in an "off" position for a predetermined period of time to allow the motor to cool following a momentary power failure. A reset 34 restores integrator 26 and detectors 20, 30, and 32 to service after a trip.

It should be evident that many of the features of FIG. 1 are partly or totally independent of each other and that the selection of the features to be used is a matter partly of design choice and partly of the selection of features that are appropriate to the load to be controlled. Thus, a load such as a rock crusher or a mill may require a jam detector but may not need to detect underload. Similarly, it may be the choice of a designer to protect against jams and underloads but not to attempt to detect loss of a phase. Such changes are readily made in the circuit of FIG. 1 by disabling the appropriate elements.

Figure 2:
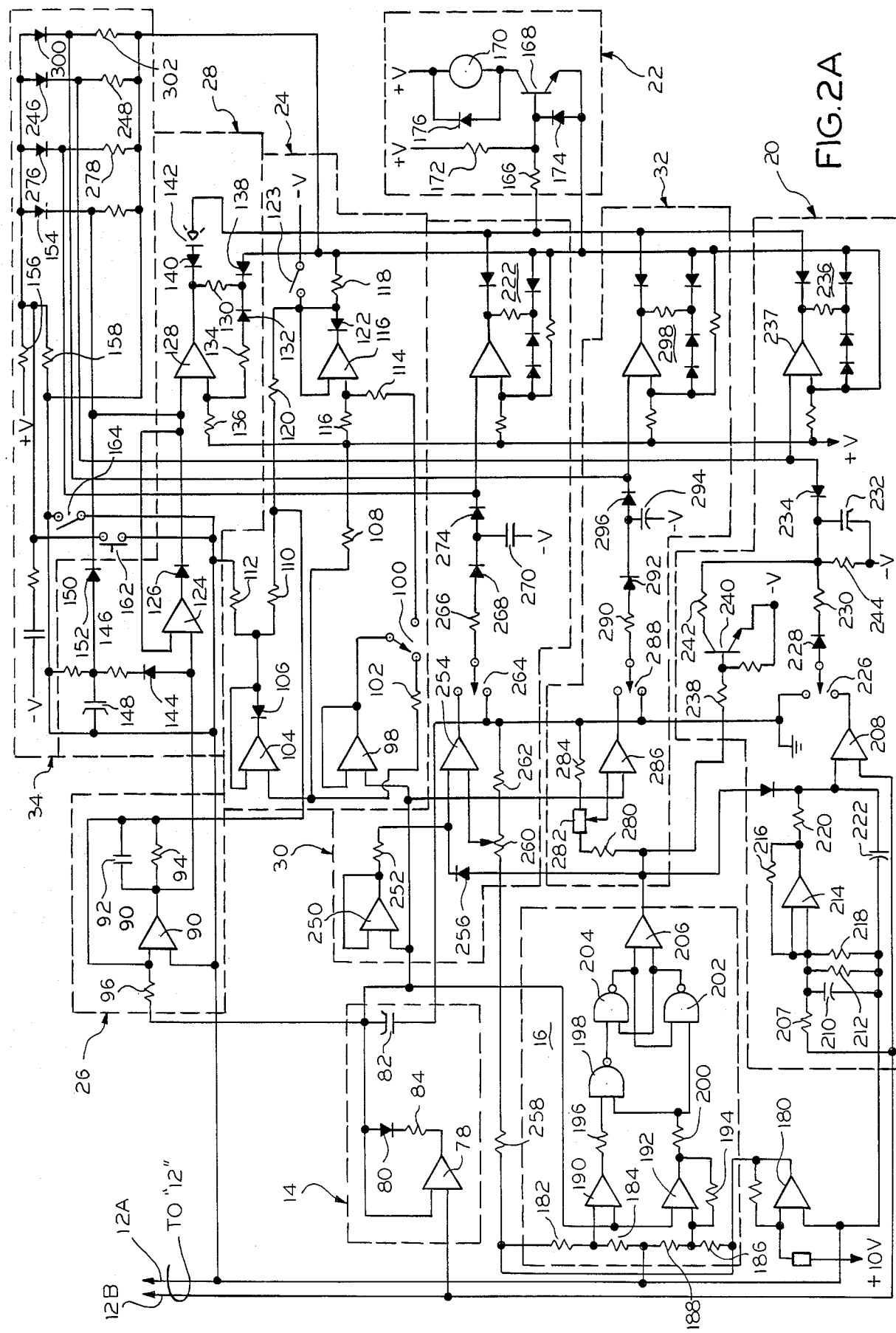
FIG. 2 is a detailed circuit diagram of a circuit for the practice of the present invention.
Figure 3:
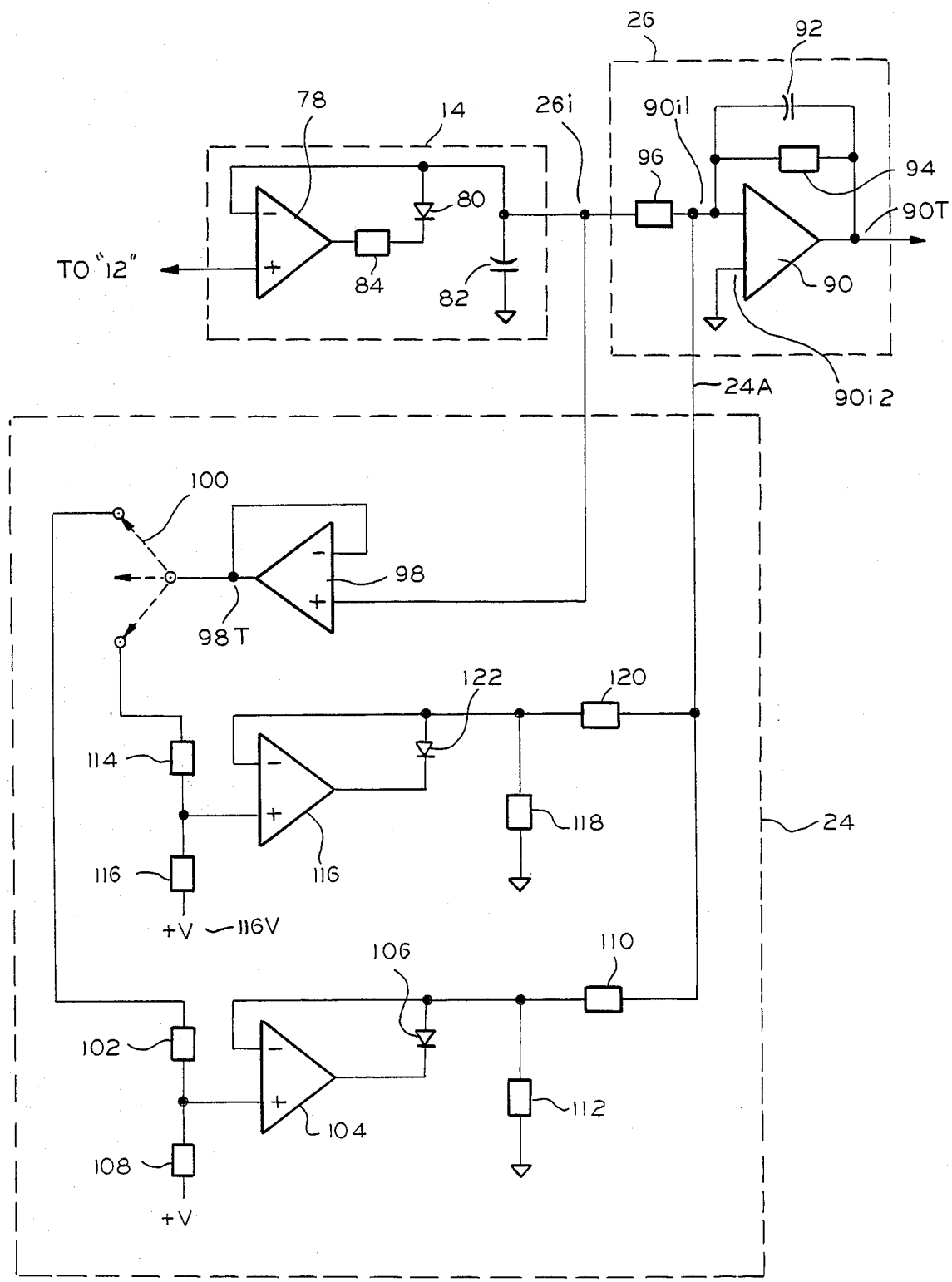
FIG. 3 is a circuit diagram giving an enlarged view of part of the circuit shown in FIG. 2.

FIG. 2 and FIG. 2A are a detailed circuit diagram of a circuit for the practice of the present invention. In FIG. 2 and FIG. 2A are elements comprising the blocks of FIG. 1 are given the same numbers. Thus, terminals 10 of FIG. 1 represent in FIG. 2 the terminals A, B, C, G that are connected to current transformers 40, 42, and 44. These current transformers together measure the load current to motor 46. That motor current is interrupted by contactors 48 and high-fault protector 50, a circuit breaker or other device designed to trip on a short circuit or other extreme overload. One phase of the power applied to motor 46 is taken to the conventional start circuit 52. A normally closed contactor 54 is added to the conventional elements of start circuit 52 to be controlled by the circuit of the present invention.

Each of the terminals A, B, and C is connected to a current transformer 56, 58, and 60 respectively. The output of each of the current transformers is rectified by diode arrays 62, 64, and 66 respectively. These arrays comprise a half-wave rectifier of the motor currents. The rectified current is applied to scaling current-voltage converter 12 in which it is taken as a negative input to operational amplifier 70. Gain of operational amplifier 70 is controlled by selecting an appropriate feedback resistor 72 with switch 74. The output of operational amplifier 70 is buffered through transistor 76 and is taken as an input to peak detector 14. The input to peak detector 14 is applied to operational amplifier 78 which in combination with diode 80 comprises the equivalent of an ideal diode to charge capacitor 82. Resistor 84 limits the charging current to protect diode 80. The effect is to generate a voltage across capacitor 82 that is a scaled equivalent of the peak values of the currents detected at current transformers 56, 58, and 60.

The output of peak detector 14 is taken as an input to integrator 26 which comprises an operational amplifier 90 with an integrating capacitor 92 having a resistor 94 connected in parallel with it. The input from peak detector 14 is applied through resistor 96. When capacitor 92 is uncharged and a voltage is applied at the output of peak detector 14, indicating that a motor is drawing current, integrator 26 generates a ramp at the output of operational amplifier 90. This ramp levels off at a voltage that is determined by the ratio of resistances of resistors 94 and 96. The values of resistors 94 and 96 and capacitor 92 are chosen to permit the flow of a stated overload percentage of motor current for a predetermined time. This is typically 6×115 percent of the rated full-load current for a time that is under 30 seconds. This is referred to as a Class 30 start. If the load current is too high for the permitted length of time or if the maximum current persists for an excessive length of time, the voltage at the output of operational amplifier 90 will be increased to a value that is sufficiently high to cause motor relay 22 to trip. The mechanism of this will be seen later.

A class 20 start characteristic is accomplished by inverse trip circuit 24 which takes the output of peak detector 14 as an input to operational amplifier 98, connected as a buffer. The output of operational amplifier 98 is applied to switch 100 which has three positions, Class 30, Class 20, and Class 10. When switch 100 is set to Class 30, there is no further use of the output of operational amplifier 98 and the output of integrator 26 is used as described above to operate motor relay 22. When switch 100 is set to select Class 20, the output of operational amplifier 98 is taken through resistor 102 to operational amplifier 104. Diode 106 is connected to the output of operational amplifier 104. The combination of resistors 108, 110, and 112 sets a voltage level that causes diode 106 and hence operational amplifier 104 to be switched off unless the current exceeds a predetermined value that is typically taken as twice the rated full-load current. When this value is exceeded, an additional voltage is applied through resistor 110 as an input to the integrator 26. This adds drive to operational amplifier 90, increasing the slope of the ramp and thus reducing the trip time.

If it is desired to limit the overload time to ten seconds or less, switch 100 is operated to select Class 10. This applies the output of operational amplifier 98 through resistor 114 to operational amplifier 116. Here a different combination of resistors 118 and 120 combines with resistors 114 and 116 to switch diode 122. As before, the effect is to increase the charging rate of capacitor 92 of integrator 26. For a given overload current this limits the amount of time that it can be applied before integrator 26 generates a signal to trip motor relay 22. This signal is also applied as an overload test by closing switch 123 to cause motor relay 22 to trip in about ten seconds.

The output of integrator 26 is taken to control motor relay 22 through memory 28. It is applied to a terminal of operational amplifier 124 which is connected to diode 126 and is operated in a feedback mode. This has the effect of making diode 126 appear to be an ideal diode. Diode 126 is connected to supply an input to operational amplifier 128. Resistor 130 is connected from the output of operational amplifier 128 to diode 132 and resistor 134 hence to a negative input of operational amplifier 128. Resistor 136 connects the negative input terminal of operational amplifier 128 to a precision voltage supply. Diode 138 as connected from the junction of resistor 130 and diode 132 to a common point. Operational amplifier 128 and the elements connected to it comprise a trip latch circuit that holds diode 140 off as long as the input voltage to operational amplifier 128 from operational amplifier 124 is less than some nominally selected voltage. If that voltage is exceeded diode 140 is caused to conduct operating light-emitting diode (LED) 142 and operating motor relay 22. Three things may cause this condition. The first is an excessive output from operational amplifier 124 indicating that integrator 26 has sensed an excessive combination of time and overload current. A second cause of such operation is a memory voltage. The output of operational amplifier 90 is taken through diode 144 and resistor 146 to charge capacitor 148. Resistor 150 is in parallel with capacitor 148. The capacitor voltage is taken through diode 152 which operates as a logical OR at the input to operational amplifier 128. A third input to operational amplifier 128 is from reset circuit 34. This applies the voltage on reset bus that is known as 154 through diode 156 to reset the latch of which operational amplifier 128 is an input. Reset bus 154 is normally held at some positive voltage determined by the ratio of resistors 156 and 158 which form a voltage divider. A reset signal, generated manually by switch 162 or automatically by leaving switch 164 closed will reduce the voltage at the input to operational amplifier 28 and thus reset the latch unless capacitor 92 has not yet had time to discharge through resistor 94. This is the memory of recent operation or overload that prevents a restart until the motor has had a predetermined time to cool.

Diode 140 serves as a logical OR on the input to motor relay 22. This includes an input resistor 166 that is connected to the base of a transistor 168 to control current to a relay coil 170. This controls the normally closed contact 54. Resistor 172 and diode 174 establish bias conditions of the operation of transistor 168. Diode 176 protects transistor 168 against current spikes.

The portions of the circuit of FIG. 2 and FIG. 2A that have been described above relate to the functions of protection against overload during a start and during normal operation and also protection against an undesired restart following a loss of power. The remaining functions of the circuit come into play only when the motor is up to speed. These functions are controlled by up-to-speed enable circuit 16. In FIG. 2 and FIG. 2A an inverter 180 provides a controlled negative voltage that is applied across resistors 182 and 184 to ground and also across resistors 186 and 188 to ground. The divided voltages that result are applied, one at the negative input to operational amplifier 190 and one at the positive input to operational amplifier 192. Feedback resistor 194 is applied around operational amplifier 192. The output of peak detector 14 is applied to the other inputs to operational amplifiers 190 and 192. The output of operational amplifier 190 is taken through resistor 196 to NAND gate 198 and the output of operational amplifier 192 is taken through resistor 200 as an input to NAND gate 198 and also to NAND gate 202. The output of NAND gate 198 is taken to NAND gate 204 which is connected to NAND gate 202 to form, together with operational amplifier 206, a set-reset flipflop. Values of resistors 182, 184, 186, and 188 are typically chosen so that enable circuit 16 produces no output from operational amplifier 206 when the controller is turned on and as current to a motor that is being started rises to a value of the order of six times rated load current. However, those values are chosen so that the flipflop is set when motor current passes through the value corresponding to twice the full-load current on its way to the maximum value. The flipflop is then reset on a decrease of that current to a value corresponding to 115 percent of rated full-load current. At this point operational amplifier 206 produces an output that is applied to line 18 to enable various other portions of the circuit.

One circuit that is enabled by up-to-speed enable circuit 16 is phase-loss detector 20 which receives an input signal from scaling current-voltage converter 12 that is applied to resistor 206 and also to operational amplifier 208. This input will be a voltage that is the logical sum of the rectified motor currents. It thus has both DC and AC components. The AC components are filtered out by capacitor 210 and resistor 212 and the DC is applied to operational amplifier 214. Feedback resistor 216 and reference resistor 218 complete the connection of operational amplifier 214 to apply to resistor 220 a voltage that is proportional to the average value of motor currents. That value is further filtered by capacitor 222. An enable signal is coupled to operational amplifier 208 through diode 224 which is operated by the signal on line 18 when operational amplifier 208 is enabled and the phase loss detector is placed in the circuit by switch 226. Current pulses are coupled through diode 228 and resistor 230 to charge capacitor 232 in the event of a phase loss. When there is no phase loss, operational amplifier 208 is disabled by the output voltage of operational amplifier 214. The phase loss is represented by a sudden change of the input voltage to the positive terminal of operational amplifier 208. That change will not be followed immediately by operational amplifier 214 and pulses will therefore be passed by operational amplifier 208 to charge capacitor 232. The voltage across capacitor 232 is coupled through diode 234 to latch circuit 236 which operates in a manner identical to the latch circuit containing corresponding components in memory 28. The output of latch circuit 236 is taken as an input to motor relay 22, the operation of which has already been described. A further refinement may be necessary to avoid false indications of phase loss in starting motors with reduced-voltage starters or under loads requiring less than full torque. That refinement applies the output of up-to-speed enable detector 16 through resistor 238 to transistor 240. When transistor 240 is switched on by a signal through resistor 238, capacitor 232 is discharged rapidly through resistor 242. This is a faster discharge than its normal discharge through resistor 244 which keeps small changes in load current from accumulating to provide a false trip indicating a loss of phase. Latch circuit 236 is reset when capacitor 232 discharges just below the reset level of operational amplifier 237. The reset voltage level is established when the output of operational amplifier 237 switches, tripping motor relay 22 after a phase loss, turning on diodes 239 in latch 236.

Jam detector 30 is designed to trip out a motor when its current suddenly increases, indicating that its load has jammed or otherwise increased to a point beyond the capacity of the motor. Jam detector 30 receives a signal that is proportional to load current from peak detector 14. That signal is applied as an input to operational amplifier 250 which together with resistor 252 comprises a buffer. A signal from resistor 252 is taken as one input to operational amplifier 254 which is enabled through diode 256 by a signal from line 18. Resistor 258, potentiometer 260 and resistor 262 comprise a voltage divided that applies a control voltage to the positive input terminal of operational amplifier 254. The setting of potentiometer 260 determines the percentage overload on which the motor will trip to indicate a jam. The output of operational amplifier 254 is selected by switch 264 and applied through resistor 266 and diode 268 to charge capacitor 270 in case of a jam. This enables latch circuit 272 through diode 274 to operate motor relay 22. Latch circuit 272 operates like latch circuit 236 and the latch circuit of memory 28, described above.

Underload circuit 32 is designed to cut off the motor that has been at speed and loses its load. In circuit 32, resistor 280 is connected in series with potentiometer 282 and resistor 284 to form a voltage divider between line 18 and ground. A setting of potentiometer 282 determines the percent underload that will trip the motor after it has come to speed. That voltage is applied as one input to operational amplifier 286, the other input of which is the output of peak detector 14. The output of operational amplifier 286 is selected by switch 288 and applied through resistor 290 and diode 292 to charge capacitor 294. The voltage on capacitor 294 is coupled through diode 296 to latch circuit 298 which functions like latch circuits 236 and 272 to operate motor relay 22.

From the point of view of a user of the present invention, operation comprises selecting a high-fault protector 50 that will trip on some value of current that is greater than the maximum amount of current that motor 46 is to draw on starting. The user then establishes connections as shown to motor 46, selecting combinations of current transformers 40, 42, 44, 56, 58, and 60 so that the divided motor phase current is in a range of 2.1 to 5.0 amperes. The desired divided value of motor full-load current is selected by switch 74. Switch 100 is then set to the desired class of operation, class 10, 20, or 30. This comprises limiting the period of motor overload to be less than 10, 20, or 30 seconds respectively during an across the-line cold start. Switch 123 is opened to provide normal operation and switch 164 is operated to select manual or automatic reset. Switch 226 is used to select the phase-loss function if desired. Switch 264 is set to select a jam function if desired. If the jam function is thus selected, potentiometer 260 is adjusted to the desired percentage of overload to be allowed before the jam switch trips motor relay 22. Switch 288 is operated to select the underload feature if this is desired. If switch 288 is used to select the underload feature, potentiometer 282 is set to the desired percent underload. Contactor 54 is then placed in series with the other elements of start circuit 52 and the motor is ready for controlled service. The overload feature is tested with the motor off by closing switch 123. Light-emitting diode 142 should light and motor relay 22 should operate within 10 seconds to show that the circuit is functioning properly.

I claim:

1. An improved feedback circuit having,
   a first amplifier (90) having a first input (90i1), a second input (90i2) and an output 90 T,
   an input resistor (96) having a first end and a second end, said first end of said input resistor forming an input (26i) of an operational amplifier (26) and said second end of said input resistor connected to said first input (90i1) of said first amplifier (90),
   a feedback impedance (92, 94) connected between said output (90 T) of said first amplifier (90) and said first input (90i1) of said first amplifier (90), wherein the improvement comprises:
   means for comparing a voltage at said input (26i) of said operational amplifier (26) with a voltage at said first input (90i1) of said first amplifier (90); and,
   means, responsive to said means for comparing a voltage at said input (26i) of said operational amplifier (26) with a voltage at said first input (90i1) of said first amplifier (90), for providing an auxiliary current path (24A) for said feedback impedance (92, 94) when said voltage at said input (26i) of said operational amplifier (26) has a predetermined relationship to said voltage at said input (90i1) of said first amplifier (90).

2. The apparatus as in claim 1 wherein said means for comparing a voltage at said input (26i) of said operational amplifier (26) with a voltage at said input of said first amplifier (90), and said means for providing an auxiliary current path (24A) for said feedback impedance (92, 94) further comprise:
   a first resistor (114) electrically connected at a first end to said input (26i) of said operational amplifier (26);
   a second resistor (116) having a first end connected to a second end of said first resistor (114), and having a second end connected to a predetermined potential (116 V);
   said second input (90i2) of said first amplifier (90) connected to a circuit ground;
   a third resistor (120) having a first end connected to said first input (90i1) of said first amplifier (90);
   a fourth resistor (118) having a first end connected to a second end of said third resistor (120) and having a second end connected to said circuit ground;
   a switching amplifier (116) having a first input connected to said second end of said first resistor (114) and said first end of said second resistor (116), having a second input connected to said second end of said third resistor (12) and said first end of said fourth resistor (118), and having an output; and,
   a diode having an anode connected to said output of said switching amplifier (116), and having a cathode connected to said second input of said switching amplifier, said diode being held in a reverse bias condition in response to,
   said predetermined potential (116 V), said first resistor (114), said second resistor (116), said third resistor (120), said fourth resistor (118), said second input (90i2) of said first amplifier (90) being connected to said circuit ground, and the absence of a signal being applied to said input (26i) of said operational amplifier (26), and a signal applied to said input (26i) of said operational amplifier (26) drives said diode (122) into a conducting state when said signal reaches a predetermined value, and conduction of said diode (122) completes said auxiliary current path (24A) for said feedback impedance (92, 94).

3. The apparatus as in claim 2 further comprising: a buffer amplifier (98) having an input connected to said input (26i) of said operational amplifier (26) and having an output electrically connected to said first end of said first resistor (114).

4. An improved integrator of the type having,
   a first amplifier (90) having a first input (90i1) a second input (90i2), and an output (90 T),
   an input resistor (96) having a first end and a second end, said first end of said input resistor forming an input (26i) of an operational amplifier (26) and said second end of said input resistor connected to said first input (90i1) of said first amplifier (90),
   a feedback resistance (94) and an integrating capacitor (92) connected in parallel with said feedback resistor (94), and both connected between said output (90 T) of said first amplifier (90) and said first input (90i1) of said first amplifier (90), said feedback resistance (94) and said integrating capacitor (94) forming a feedback impedance, wherein the improvement comprises:
   means for comparing a voltage at said input (26i) of said operational amplifier (26) with a voltage at said first input (90i1) of said first amplifier (90); and,
   means, responsive to said means for comparing a voltage at said input (26i) of said operational amplifier (26) with a voltage at said first input (90i1) of said first amplifier (90), for providing an auxiliary current path (24A) for said feedback impedance (92, 94) when said voltage at said input (26i) of said operational amplifier (26) has a predetermined relationship to said voltage at said input (90i1) of said first amplifier (90).

5. An improved integrator of the type having,
   a first amplifier (90) having a first input (90i1), a second input (90i2), and an output (90 T),
   an input resistor (96) having a first end and a second end, said first end of said input resister forming an input (26i) of an operational amplifier (26) and said second end of said input resistor connected to said first input (90i1) of said first amplifier (90),
   a feedback resistor (94) and an integrating capacitor (92) connected in parallel with said feedback resistor (94), and both connected between said output (90 T) of said first amplifier (90) and said first input (90i1) of said first amplifier (90), wherein the improvement comprises:
   a first resistor (114) electrically connected at a first end to said input (26i) of said operational amplifier (26);
   a second resistor (116) having a first end connected to a second end of said first resistor (114), and having a second end connected to a predetermined potential (116 V);
   said second input (90i2) of said first amplifier (90) connected to a circuit ground;
   a third resistor (120) having a first end connected to said first input (90i1) of said first amplifier (90);
   a fourth resistor (118) having a first end connected to a second end of said third resistor (120) and having a second end connected to said circuit ground;

a switching amplifier (116) having a first input connected to said second end of said first resistor (114) and said first end of said second resistor (116), having a second input connected to said second end of said third resistor (120) and said first end of said fourth resistor (118), and having an output; and a diode (122) having an anode connected to said output of said switching amplifier (116), and having a cathode connected to said second input of said switching amplifier, said diode being held in a reverse bias condition in response to, said predetermined potential (116 V), said first resistor (114), said second resistor (116), said third resistor (120), said fourth resistor (118), said second input (90i2) of said first amplifier (90) being connected to said circuit ground, and the absence of a signal being applied to said input (26i) of said operational amplifier (26), and a signal applied to said input (26i) of said operational amplifier (26) drives said diode (122) into a conducting state when said signal reaches a predetermined value, and conduction of said diode (122) completes an auxiliary current path (24A) for said integrating capacitor (92).

6. An apparatus to protect an electric motor from damage during start, said apparatus producing an inverse characteristic wherein a higher motor current is allowed for a shorter time than a lower motor current, said apparatus comprising:
   (a) means for producing a current signal that is a measure of current in the electric motor;
   (b) means for producing an integrated value of the current signal as a function of time, and using a predetermined integration time constant;
   (c) means for changing said predetermined integration time constant in response to the current in the electric motor including, an operational amplifier (26) having, a first amplifier (90) having a first input (90i1), a second input (90i2) and an output (90 T);

an input resistor (96) having a first end and a second end, said first end of said input resistor forming an input (26i) of said operational amplifier (26) and said second end of said input resistor connected to said first input (90i1) of said amplifier (90);

a feedback impedance (92, 94) connected between said output (90 T) of said amplifier (90) and said first input (90i1) of said amplifier (90);

means for comparing a voltage at said input (26i) of said operational amplifier (26) with a voltage at said first input (90i1) of said first amplifier (90);

means, responsive to said means for comparing a voltage at said input (26i) of said operational amplifier (26) with a voltage at said first input (90i1) of said first amplifier (90), for providing an auxiliary current path (24A) for said feedback impedance (92, 94) when said voltage at said input (26i) of said operational amplifier (26) has a predetermined relationship to said voltage at said input (90i1) of said first amplifier (90); and
   (d) means for interrupting power to the electric motor when the integrated value of the current signal exceeds a predetermined value.

7. An apparatus to protect an electric motor from damage during start, said apparatus producing an inverse characteristic wherein a higher motor current is allowed for a shorter time than a lower motor current, said apparatus comprising:
   (a) means for producing a current signal that is a measure of current in the electric motor;
   (b) means for producing an integrated value of the current signal as a function of time, and using a predetermined integration time constant;
   (c) means for changing said predetermined integration time constant in response to the current in the electric motor comprising;
   (d) means for interrupting power to the electric motor when the integrated value of the current signal exceeds a predetermined value; and a second means for changing the integration time constant in response to the current in the electric motor;

a switch having three positions for selecting the following, (1) said means for changing the integration time constant in response to the current in the electric motor, (2) said second means for changing the integration time constant in response to the current in the electric motor, (3) bypassing said means for changing the integration time constant so that in the bypassed position said apparatus provides a class 30 start, in said position (1) said apparatus provides a class 20 start, and in said position (2) said apparatus provides a class 10 start.

8. An improved operational (26) amplifier having,
a first amplifier (90) having a first input (90i1), a second input (90i2) and an output 90T, an input resistor (96) having a first end and a second end, said first end of said input resistor forming an input (26i) of said operational amplifier (26) and said second end of said input resistor connected to said first input (90i1) of said first amplifier (90), a feedback impedance (92, 94) connected between said output (90 T) of said first amplifier (90) and said first input (90i1) of said first amplifier (90), wherein the improvement comprises:

a first resistor (114) electrically connected at a first end to said input (26i) of said operational amplifier (26);

a second resistor (116) having a first end connected to a second end of said first resistor (114), and having a second end connected to a predetermined potential (116 V);

said second input (90i2) of said amplifier (90) connected to a circuit ground;

a third resistor (120) having a first end connected to said first input (90i1) of said amplifier (90);

a fourth resistor (118) having a first end connected to a second end of said third resistor (120) and having a second end connected to said circuit ground;

a switching amplifier (116) having a first input connected to said second end of said first resistor (114) and said first end of said second resistor (116), having a second input connected to said second end of said third resistor (12) and said first end of said fourth resistor (118), and having an output; and a diode (122) having an anode connected to said output of said switching amplifier (116), and having a cathode connected to said second input of said switching amplifier, said diode being held in a reverse bias condition in response to, said predetermined potential (116 V), said first resistor (114), said second resistor (116), said third resistor (120), said fourth resistor (118), said second input (90i2) of said first amplifier (90) being connected to said circuit ground, and the absence of a signal being applied to said input (26i) of said operational amplifier (26), and a signal applied to said input (26i) of said operational amplifier (26) drives said diode (122) into a conducting state when said signal reaches a predetermined value, and conduction of said diode (122) completes said auxiliary current path (24A) for said feedback impedance (92, 94).

9. An improved operational amplifier (26) having, a first amplifier (90) having a first input (90i1), a second input (90i2) and an output 90T, an input resistor (96) having a first end and a second end, said first end of said input resistor forming an input (26i) of said operational amplifier (26) and said second end of said input resistor connected to said first input (90i1) of said first amplifier (90), a feedback impedance (92, 94) connected between said output (90T) of said first amplifier (90) and said first input (90i1) of said first amplifier (90), wherein the improvement comprises:

a buffer amplifier (98) having an input connected to said input (26i) of said operational amplifier (26), and having an output;

a selector switch (100) having a selector element having a plurality of positions, and having said output of said buffer amplifier connected to said selector element;

a plurality of means for comparing a voltage at said input (26i) of said operational amplifier (26) with a voltage at said first input (90i) of said first amplifier (90); and, a plurality of means, responsive to said means for comparing a voltage at said input (26i) of said operational amplifier (26) with a voltage at said first input (90i1) of said amplifier (90), for providing an auxiliary current path (24A) for said feedback impedance (92, 94) when said voltage at said input (26i) of said operational amplifier (26) has a predetermined relationship to said voltage at said input (90i1) of said first amplifier (90), said plurality of means for comparing a voltage and said plurality of means for providing an auxiliary current path being individually selectable by putting said selector switch in a predetermined one of said plurality of positions.

10. An apparatus for protecting an electric motor from damage during start, said apparatus producing an inverse characteristic wherein a higher motor current is allowed for a shorter time than a lower motor current, said apparatus comprising:

(a) means for producing a current signal that is a measure of current in the electric motor;

(b) an operational amplifier (26) for producing an integrated value of said current signal as a function of time, and using a predetermined integration time constant, and having, a first amplifier (90) having a first input (90i1), a second input (90i2) and an output (90 T), an input resistor (96) having a first end and a second end, said first end of said input resistor forming an input (26i) of said operational amplifier (26) and said second end of said input resistor connected to said first input (90i1) of said amplifier (90), a feedback impedance (92, 94) connected between said output (90 T) of said amplifier and said first input (90i1) of said first amplifier (90);

means for comparing a voltage at said input (26i) of said operational amplifier (26) with a voltage at said first input (90i1) of said first amplifier (90); and, means, responsive to said means for comparing a voltage at said input (26i) of said operational amplifier (26) with a voltage at said first input (90i1) of said first amplifier (90), for providing an auxiliary current path (24A) for said feedback impedance (92, 94) when said voltage at said input (26i) of said operational amplifier (26) has a predetermined relationship to said voltage at said input (90i1) of said amplifier (90) in order to change said predetermined integration time constant in response to said current in said electric motor;

(c) means for interrupting power to said electric motor when the integrated value of said current signal exceeds a predetermined value.

11. An improved operational amplifier (26) having, an amplifier (90) having a first input (90i1), a second input (90i2) and an output 90 T, an input resistor (96) having a first end and a second end, said first end of said input resistor forming an input (26i) of said operational amplifier (26) and said second end of said input resistor connected to said first input (90i1) of said first amplifier (90), a feedback impedance (92, 94) connected between said output (90 T) of said first amplifier of said first input (90i1) of said first amplifier (90), wherein the improvement comprises:

means for comparing a voltage at said first end of said input resistor (96) with a voltage at said second end of said input resistor (96) for generating a signal voltage; and, means, responsive to said signal voltage, for providing an auxiliary current path (24A) for said feedback impedance (92, 94) when said signal voltage has a predetermined value.

12. An improved operational amplifier comprising: an input to said operational amplifier;

a first amplifier having a first input, a second input, and an output, and said output forming an output of said operational amplifier;

an input impedance having a first end forming said input to said operational amplifier and having a second end connected to said first input of said first amplifier;

a feedback impedance having a first end and a second end, said first end of said feedback impedance connected to said first input of said first amplifier, and said second end of said feedback impedance connected to said output of said first amplifier;

means, responsive to a voltage at said input to said operational amplifier and responsive to a voltage at said first input to said first amplifier, for providing electric current flow to said feedback impedance in the event that a ratio of said voltage at said input to said operational amplifier to said voltage at said first input to said first amplifier exceeds a predetermined value, and a feedback time constant to said operational amplifier is changed in the event that said ratio exceeds said predetermined value.

* * * * *